United States Patent
Feeser

(10) Patent No.: US 8,485,088 B2
(45) Date of Patent: Jul. 16, 2013

(54) COOLING CHANNEL PISTON FOR AN INTERNAL COMBUSTION ENGINE AND METHOD FOR THE PRODUCTION THEREOF

(75) Inventor: Reiner Feeser, Helibronn (DE)

(73) Assignee: KS Kolbenschmidt GmbH, Neckarsulm (DE)

( * ) Notice: Subject to any disclaimer, the term of this patent is extended or adjusted under 35 U.S.C. 154(b) by 1048 days.

(21) Appl. No.: 12/307,663

(22) PCT Filed: Jun. 21, 2007

(86) PCT No.: PCT/EP2007/005456
§ 371 (c)(1),
(2), (4) Date: May 4, 2009

(87) PCT Pub. No.: WO2008/003401
PCT Pub. Date: Jan. 10, 2008

(65) Prior Publication Data
US 2009/0241769 A1    Oct. 1, 2009

(30) Foreign Application Priority Data

Jul. 7, 2006  (DE) .......................... 10 2006 031 892
Mar. 20, 2007  (DE) .......................... 10 2007 013 183

(51) Int. Cl.
*F16J 15/18*    (2006.01)
*B23P 15/10*    (2006.01)

(52) U.S. Cl.
USPC .............................. 92/186; 92/260; 29/888.04

(58) Field of Classification Search
USPC .................................. 92/186, 260; 29/888.04
See application file for complete search history.

(56) References Cited

U.S. PATENT DOCUMENTS

| 3,877,351 | A |   | 4/1975 | Barfiss et al. |
| 4,651,631 | A |   | 3/1987 | Avezou et al. |
| 5,713,262 | A | * | 2/1998 | Sugiyama et al. ............. 92/158 |
| 5,771,776 | A | * | 6/1998 | Itoh ................................ 92/186 |

(Continued)

FOREIGN PATENT DOCUMENTS

| CH | 230566 A | 1/1944 |
| DE | 2537182 | 3/1977 |

(Continued)

OTHER PUBLICATIONS

Co-pending related U.S. Appl. No. 12/066,886, filed Mar. 18, 2008 entitled "Piston, Especially Cooling Channel Piston, of an Internal Combustion Engine, Comprising Three Friction Welded Zones" assigned to the same assignee as the subject.

(Continued)

*Primary Examiner* — Thomas E Lazo
(74) *Attorney, Agent, or Firm* — Young, Basile, Hanlon & MacFarlane, P.C.

(57) ABSTRACT

A method for producing a one-piece, lightweight piston consisting of steel and having a small compression depth (S) forms piston with at least one cavity in a shaft aperture region. A piston blank is produced in a first step using a forging or casting method. To form a cooling channel between an annular region and a combustion chamber recess an annular section is formed in one piece onto the wall of a cooling channel in the vicinity of the piston base. The joint produced between the annular section and an outer wall of the cooling channel is sealed by welding.

6 Claims, 3 Drawing Sheets

U.S. PATENT DOCUMENTS

| | | | |
|---|---|---|---|
| 6,155,157 | A | 12/2000 | Jarrett et al. |
| 6,324,961 | B1 | 12/2001 | Akimoto Yoshiaki |
| 6,477,941 | B1 | 11/2002 | Zhu Xilou et al. |
| 6,729,291 | B1 | 5/2004 | Scharp et al. |
| 7,406,941 | B2 * | 8/2008 | Zhu et al. .................. 123/193.6 |
| 2001/0025568 | A1 | 10/2001 | Kemnitz |
| 2001/0029840 | A1 | 10/2001 | Gaiser et al. |
| 2003/0140885 | A1 | 7/2003 | Grassi |
| 2005/0283976 | A1 * | 12/2005 | Otaka ........................ 29/888.04 |

FOREIGN PATENT DOCUMENTS

| | | | |
|---|---|---|---|
| DE | 3713191 | C1 | 7/1988 |
| DE | 10145589 | | 4/2003 |
| DE | 102004038 | A1 | 2/2006 |
| DE | 102994038464 | | 2/2006 |
| EP | 0877160 | | 11/1996 |
| EP | 1084793 | | 3/2001 |
| EP | 1614885 | A | 1/2006 |
| EP | 1614885 | A2 * | 1/2006 |
| EP | 1611975 | A | 4/2006 |
| FR | 2668090 | A1 | 4/1992 |
| GB | 1092720 | A | 11/1967 |
| JP | 52031213 | | 3/1977 |
| JP | 60166158 | | 8/1985 |
| JP | 2003025076 | | 1/2003 |
| SU | 1518562 | | 10/1989 |

OTHER PUBLICATIONS

Co-pending related U.S. Appl. No. 12/066,890, filed Apr. 10, 2008 entitled "Piston, Especially Cooling Channel Piston, of an Internal Combustion Engine, Comprising Three Friction Welded Zones" assigned to the same assignee as the subject.

International Search Report dated Feb. 11, 2006 for PCT/EP/2006/007368.

The English Translation of the International Preliminary Report on Patentability dated Aug. 2, 2006 for PCT/EP2006/007638.

International Search Report dated Apr. 5, 2008 for PCT/EP2005/010063.

The English Translation of the Preliminary International Report on Patentability for PCT/EP2005/010063, Jul. 8, 2008.

International Search Report Dated Dec. 15, 2006 for PCT/EP2006/010033.

Written Finding of the International Search Authority for PCT/EP2006/010033, Oct. 7, 2008.

International Search Report dated Aug. 21, 2007 for PCT/EP2007/005456.

Written Opinion of the International Search Authority for PCT/EP2007/005456, Jan. 7, 2009.

International Preliminary Report on Patentability for PCT/EP2005/010061, Jul. 8, 2008.

International Search Report dated Jun. 25, 2006 for PCT/EP2005/010061.

* cited by examiner

COOLING CHANNEL PISTON FOR AN INTERNAL COMBUSTION ENGINE AND METHOD FOR THE PRODUCTION THEREOF

BACKGROUND

The invention to a method for producing a one-piece steel piston for an internal combustion engine.

EP 452 250 A2 relates to a forging process to produce a one-piece steel piston. To create a cooling channel, an outwardly projecting circumferential shoulder is formed in the area of a top land using this process, which his assigned to a similarly circumferential recess. In a further step, the shoulder is formed over by bending to create a closed cooling channel.

A process for producing a forged piston head is known from DE 37 13 191 C1 in which one step includes the forming over or bending over of the annular section into a final position. This piston contains a cooling channel located toward the outside with a relatively small cross-section which provides only a local cooling effect for the piston and is thus inadequate over a wide area.

Furthermore, steel pistons for commercial vehicles are known in which the cooling channel is closed with a cover plate. This step is only possible with open and easily accessible cooling channels and additionally requires a great investment in mechanical machining work. Furthermore, the boring of the cooling channel on the finished component restricts design freedom. In casting technology, passenger-car steel pistons are produced experimentally using the lost-core process, in particular, a ceramic core. This process-related, complicated and cost-intensive process disadvantageously requires complex tools to produce the blanks.

Using the prior art as a point of departure, it is desirable to implement a heavy-duty, weight- and cost-optimized cooling channel piston that encloses an enlarged cooling channel.

SUMMARY

Between an annular region and a combustion chamber recess, a piston encloses a cooling channel which is closed by bending over or bending in of an area of the piston head. The placement of the cooling channel produced by means of forging or mechanical machining that is spaced axially to the annular region and the combustion chamber recess brings about effective coolant contact, combined with an optimal cooling effect of the piston areas with the greatest thermal loads, such as piston annular region, combustion chamber recess and at least one edge zone of the top land. To implement an advantageously enlarged cooling channel volume, the cooling channel design permits thin wall thicknesses that improve heat transfer, resulting in a piston which can achieve an optimal cooling effect. The location and design of the cooling channel effect a desirable reduction in compression depth simultaneously resulting in a desirable reduction in piston mass.

The light-weight steel piston blank is produced in a single step by a forging process. In a subsequent forming over or bending over of a piston head area, the cooling channel is closed before a resulting joint is sealed by means of a weld seam. This requires neither coring installations, a friction welding process, nor the insertion or addition of sheet metal parts. Production which can be advantageously transferred to a casting process has a great savings potential because of the reduced number of processes. The concept simplifies, or optimizes, the production of one-piece steel pistons which are intended for high-speed, heavy-duty diesel internal combustion engines that achieve power output of >80 KW/L, with compression pressures of >200 bar.

One aspect of the piston extends an inner wall of the cooling channel assigned to the combustion chamber recess. After the forming over, or bending in, the extended wall section forming an annular section is assigned with one open end to a step on the outer wall of the piston. The annular section is advantageously supported on the outer wall to form a positive fit. A suitable solution is to provide the outer wall of the piston with a stepped section on which the annular section is positioned in place.

In the shaft aperture region, the piston includes an array of cavities or openings as a further measure to reduce piston mass. The preference is to introduce holes in the shaft aperture region distributed symmetrically around the circumference, offset to a piston pin boss through which effective weight reduction can be achieved without compromising the strength of the piston The cooling channel extending at least over a length of the annular region preferably forms a cross-sectional profile that is rectangular as far as possible. This design advantageously increases the volumetric flow and thus coolant input whereby the cooling effect on the piston can be substantially increased. In addition, the large volume of the cooling channel design reduces piston weight. At the same time, this cooling channel shape increases the latitude for locating openings in the cooling channel for the entry and exit of coolant from the viewpoint of optimal contact.

A further feature provides for designing the walls of the cooling channel with almost identical wall thicknesses. As the result of a cooling channel with matched walls whose thickness is identical as far as possible, a structurally strong piston which can withstand the highest demands can be realized.

The design and the production method of the piston permits a preferred small compression depth which directly influences piston mass With the piston according to the invention, the compression depth (S) of $\leq 0.7 \times$ piston diameter (D) can be advantageously realized

BRIEF DESCRIPTION OF THE DRAWING

The following description explains a cooling channel piston illustrated in FIGS. 1 to 3 in which.

DETAILED DESCRIPTION

Figure 1:
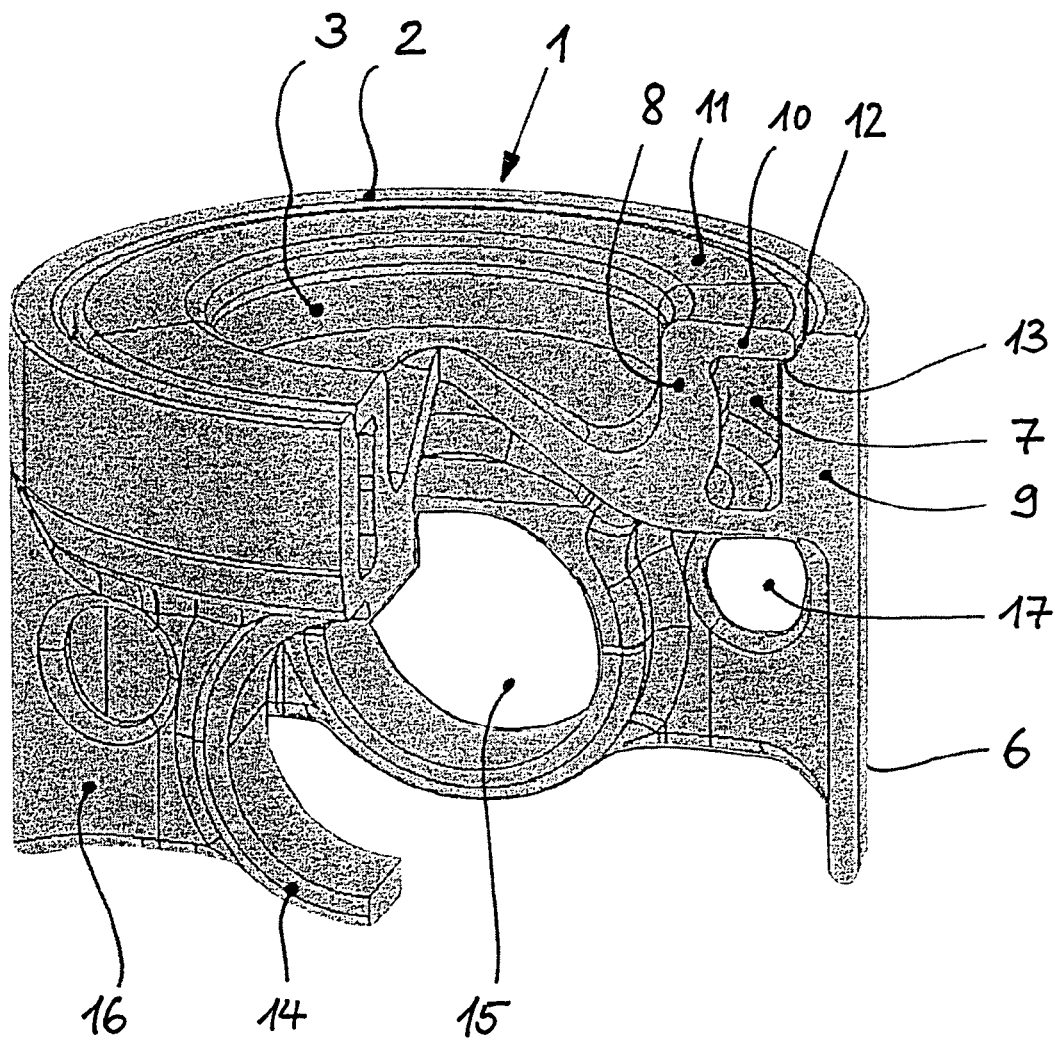
FIG. 1 is a perspective view of a cooling channel piston following forming over of one wall of the cooling channel.
Figure 3:
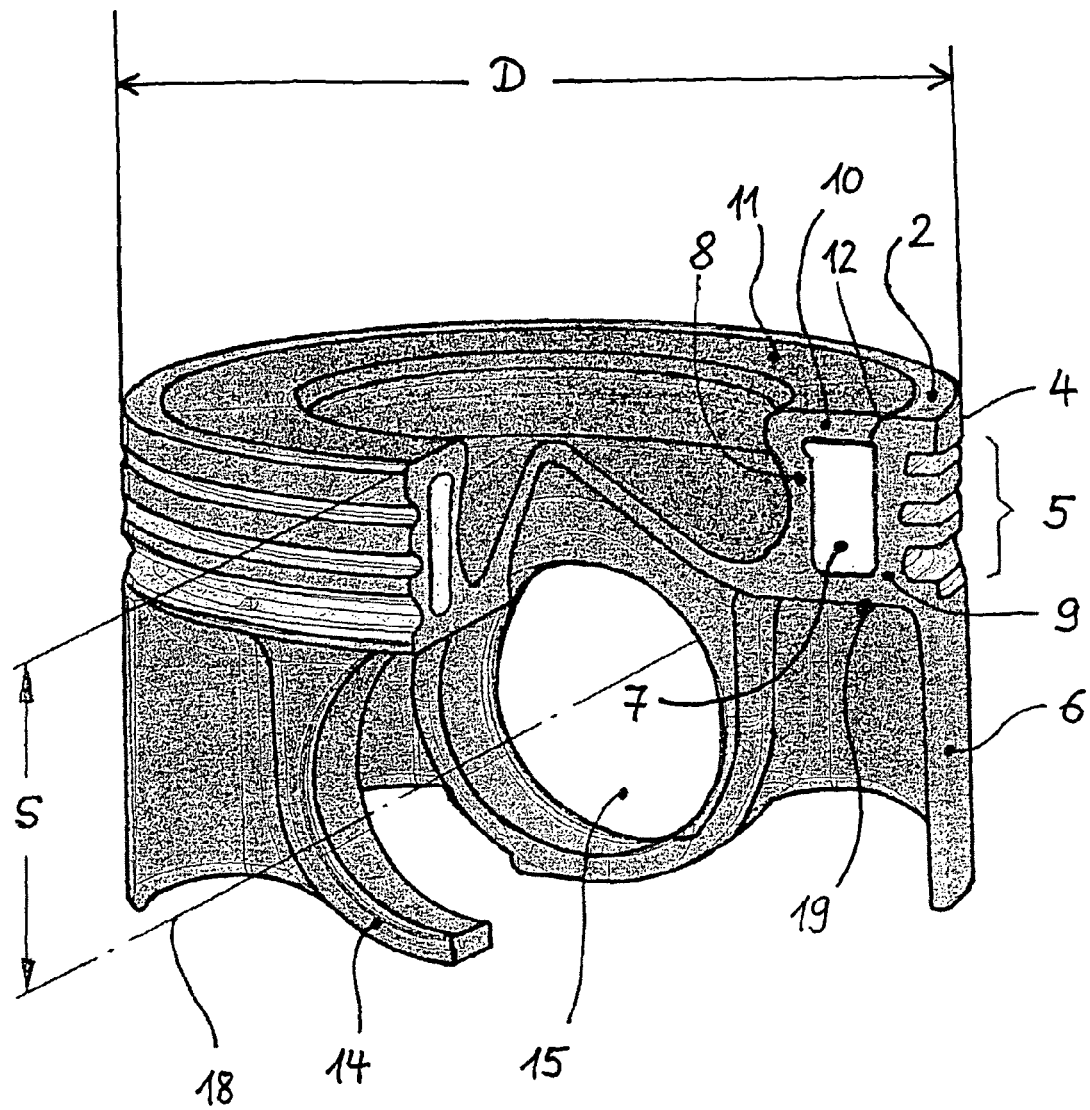
FIG. 3 is a perspective view of the cooling channel piston from FIG. 1 after completion.

FIG. 1 shows a perspective view of a one-piece piston 1, designed as a cooling-channel piston, in conjunction with a partial section. This piston 1 produced by means of a forging or casting process is shown as a piston blank that creates a rough- or finish-formed combustion chamber recess 3 centrally in a piston head 2. A top land 4 shown in FIG. 3 is attached to the piston base 2 on an outer jacket of the piston 2, below which is an annular region 5 and a piston shaft 6. An circumferential cooling channel 7, integrated in the piston 1, is bounded laterally by an inner wall 8 assigned to the combustion chamber recess and an outer wall 9 assigned to the annular region 5. An annular section 10 connected in one piece with the inner wall 8 and bent over by reshaping seals the cooling channel 7 and at the same time forms a piston base area 11. An open end of the annular section 20 is supported on a step 13 of the outer wall 9, forming a joint 12. The joint 12 is sealed by welding or brazing. The shaft 6 of the piston 1 encloses diametrically opposite piston pin bosses 14 each of which encloses a piston pin bore 15. Offset to the piston pin bosses 14, cavities 17 are introduce in a shaft aperture region 16 of the shaft 6 distributed symmetrically around the perimeter to reduce weight.

Figure 2:
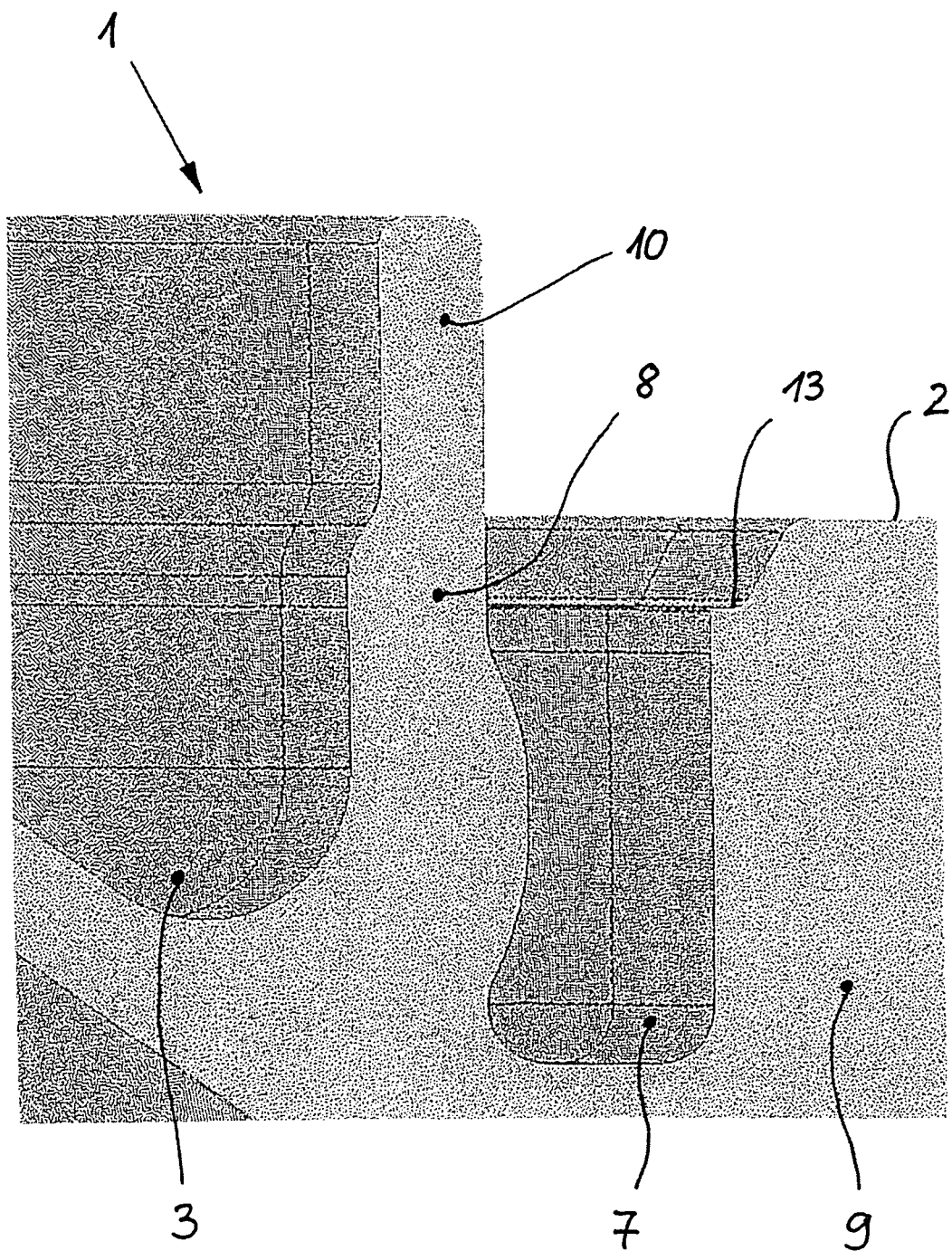
FIG. 2 is an enlarged cross section of the piston from FIG. 1.

A section of the piston is illustrated as a piston blank in FIG. 2 on an enlarged scale. The inner wall 8 of the cooling channel 7 is extended by the annular section 10 that is bent in or formed over in a subsequent step until it abuts the step 13 of the wall 9.

The piston 1 is shown in FIG. 3 as a finished part. This illustration shows additional details of the piston 1 such as the annular region 5 intended for piston rings, which is adjacent the top land. The cooling channel 7 has a longitudinal extension that coincides as far as possible with the length of the annular region 5 and includes at least on edge zone of the top land 4. Furthermore, this illustration clarifies the design of the cooling channel 7 that is enclosed by walls 8, 9, 10 and 19 of almost equal wall thickness and, in this case, has a rectangular profile as far as possible, and/or is created by geometric shape of the finish-turned combustion chamber recess 3, the piston head area 11, the annular region 5 and the internal shape by maintaining consistently thin walls. In particular, the layout of the cooling channel 7 effects a desirable, reduced compression dept "S" which defines a distance between a piston pin boss axis 18 and the piston head 2.

What is claimed is:

1. A method for producing one-piece steel piston with a small compression depth for an internal combustion engine which encloses a cooling channel adjacent an annular region, the method comprising the steps of:

forging a piston blank with an extended inner wall of the cooling channel, creating a cooling channel located between the annular region and a combustion chamber recess by reshaping the extended inner wall;

an open end of the extended inner wall of the cooling channel assigned to the combustion chamber bowl and shaped as an annular section coacting with an outer piston wall as the result of being formed over;

supporting the annular section on a stepped section of the outer piston wall;

forming a bevel in the outer piston wall defining an open ended gap between an upper edge of the outer piston wall and the reshaped end of the open end of the extended inner wall;

using the open gap to seal a resulting joint to close the cooling channel; and forming the piston with at least one cavity in a piston shaft wall below the annular region.

2. The piston of claim 1, wherein:
the shaft aperture region offset to a piston pin boss incorporates a plurality of bores distributed symmetrically about the periphery of the piston shaft wall to form the cavities.

3. The piston of claim 1 wherein:
the cooling channel extending at least over one length of the annular region has a rectangular cross-sectional profile as far as possible with consistently thin wall thicknesses to the delimiting external geometries.

4. The piston of claim 1 wherein:
the cooling channel is enclosed by the walls of almost equal wall thickness.

5. The piston of claim 1, wherein:
a compression depth of $\leqq 0.7 \times$ diameter (D) of the piston is provided for in the piston.

6. The piston of claim 1, wherein:
the at least one cavity is a bore formed in the piston shaft region offset from a piston pin boss.

* * * * *